Jan. 19, 1943. H. J. DE N. McCOLLUM 2,308,887
HEATING SYSTEM
Filed June 24, 1939 2 Sheets—Sheet 1
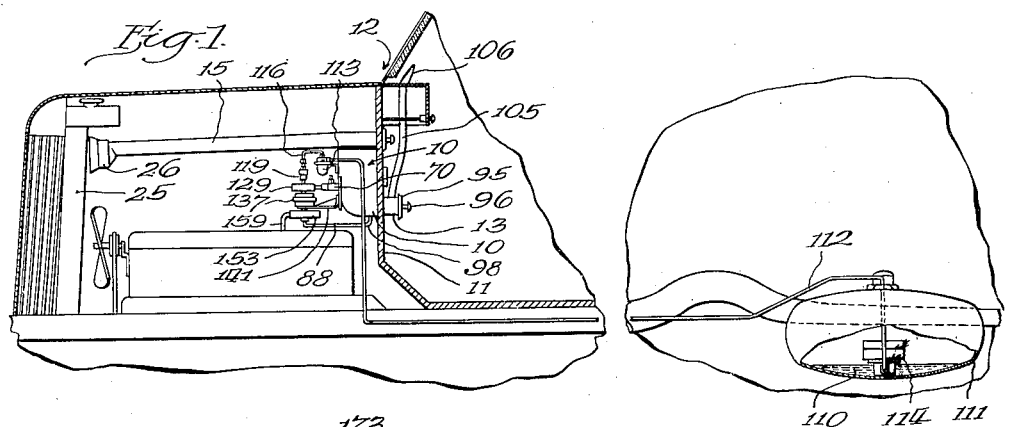
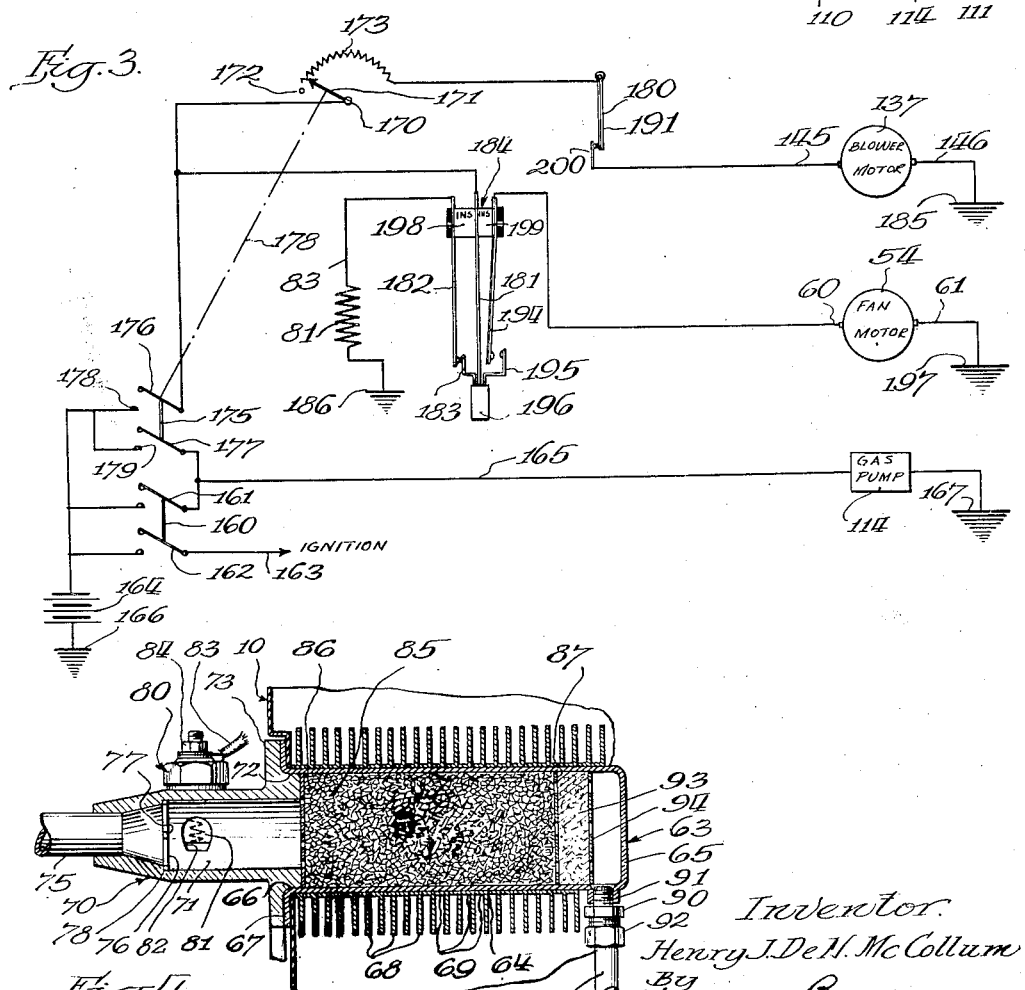
Inventor.
Henry J. De N. McCollum
By
Williams, Bradbury,
McCaleb & Hinkle
Attys.

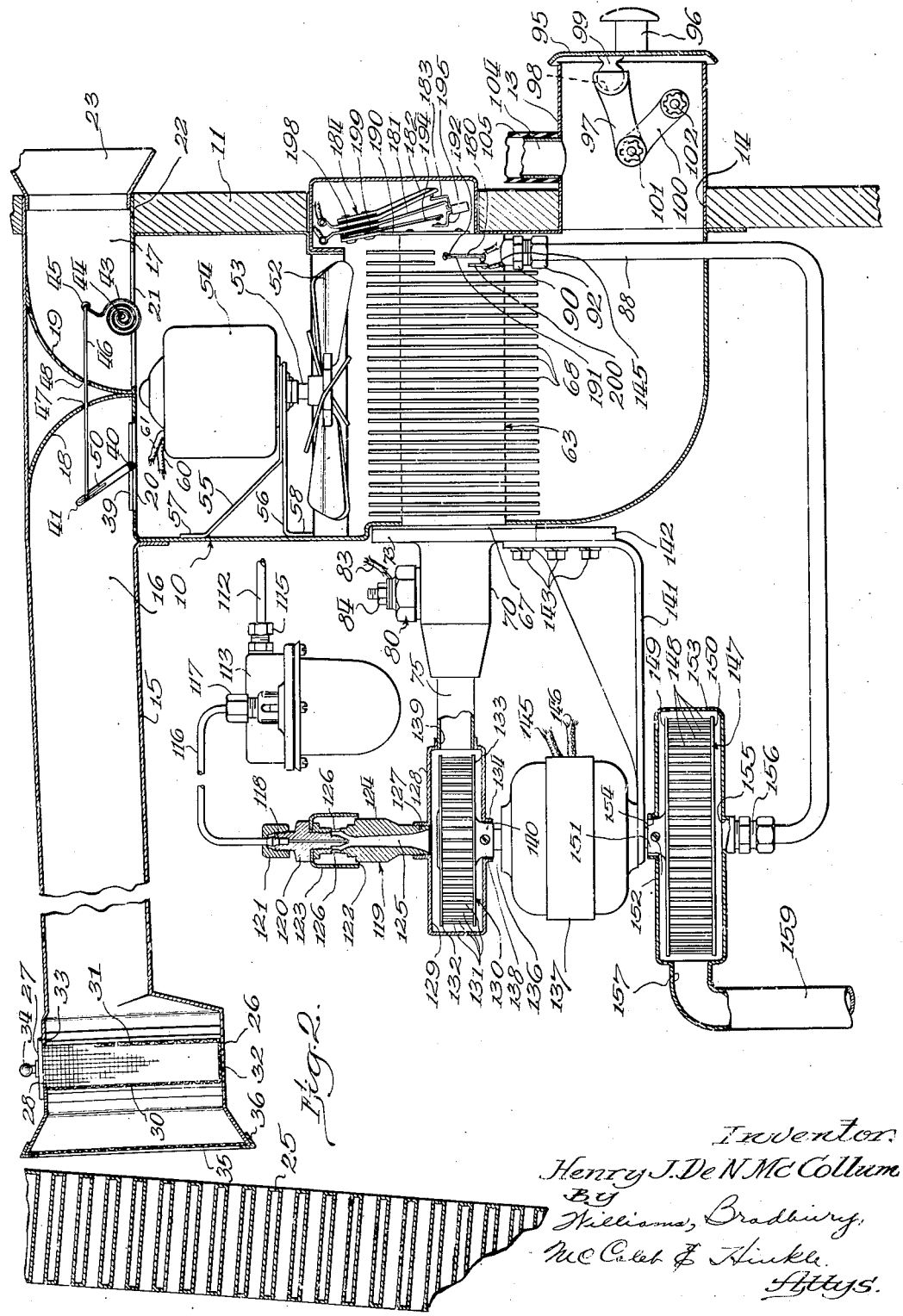

Patented Jan. 19, 1943

2,308,887

UNITED STATES PATENT OFFICE 2,308,887

HEATING SYSTEM

Henry J. De N. McCollum, Evanston, Ill.

Application June 24, 1939, Serial No. 281,013

6 Claims. (Cl. 158—28)

My invention relates to heating systems, and more particularly to heating systems for automobile passenger compartments, trailers, and other vehicles or conveyances.

An object of my invention is to provide a heater for automobiles or vehicles which operates independently of the automobile or vehicle engine, and the automobile or vehicle engine cooling system to heat the automobile or vehicle regardless of whether the engine is running or not.

Another object of my invention is to provide a heating system for automobiles or vehicles, which is inexpensive to operate, efficient and safe with respect to the hazards of both fire and fumes.

Another object of my invention is to provide an independently operable heating system for automobiles or vehicles, which embodies suitable electrical apparatus and controls for starting and operating the system, as well as for automatically controlling the same responsive to abnormal conditions.

Another object of my invention is to provide a heating system for automobiles which includes a heating unit of the internal combustion type and parts adapted to be mounted on the engine compartment side of the fire wall of the vehicle.

Other objects will become apparent from the drawings herein, the description relating thereto, and the appended claims.

In the drawings:

Fig. 1 is a fragmentary side sectional view of portions of an automobile showing a preferred embodiment of my invention therein;

Fig. 2 is a side view of a heating system embodying a preferred form of my invention and having parts thereof shown in section;

Fig. 3 is a diagrammatic representation of a preferred electrical circuit embodied in my invention and utilized for controlling the operation of a heating system such as that shown in Fig. 2; and Fig. 4 is a sectional side view of a preferred form of heating unit embodied in my invention.

Having particular reference to the drawings, a housing 10 is secured on the engine compartment side of a fire wall of an automobile 12, and has a tubular extension 13 thereon which extends through an opening 14 in the fire wall 11 into the passenger compartment of the automobile to conduct heated air into the passenger compartment. A conduit 15 is secured to and extends across one side of the housing 10. The conduit 15 is preferably divided into two sections 16 and 17 by a pair of curved baffles 18 and 19 so that the conduit section 16 communicates with the housing 10 through an opening in the housing, and the conduit section 17 communicates with the housing 10 through an opening 21 in the housing. The conduit section 17 extends through an opening 22 in the fire wall 11 into the passenger compartment, and preferably has a flared end bell 23 secured in the end thereof that opens into the passenger compartment. The conduit section 16 extends toward a radiator 25 of the automobile and preferably has an enlarged end portion 26 in which an air filter 27 is removably mounted through an opening 28 in one side of the conduit. The air filter 27 comprises a screen having portions 30 and 31 that extend across the conduit opening and are joined by a portion 32. This filter has a cover plate 33 that covers the opening 28 through which it is inserted into the conduit and a handle 34. A filter screen 35 also covers the end of the conduit and is secured thereto by a flanged bezel 36.

A butterfly valve 39 is rotatably mounted on a shaft 40 adjacent the opening 20 to control the passage of air from the conduit section 16 through that opening into the housing 10. A lever arm 41 projects angularly from and has one end secured to the valve 39. A spirally wound bimetallic thermostat element 43 has its inner end anchored to a stationary pin 44 in the conduit section 17 and its outer end 45 free to move responsive to flexure effected by temperature variations of the air in the conduit section 17. A link 46 extends through openings 47 and 48 in the baffles 18 and 19 respectively; one end being connected to the free end 45 of the thermostat element and the other end engaging a slot 50 in the lever arm 41 to move the butterfly valve 39 responsive to movements of the thermostat element 43.

A fan 52 is mounted within the housing 10 on a shaft 53 of a motor 54 to be driven by the motor to circulate air from the conduit section 17 or both conduit sections 16 and 17 through the housing 10 and tubular extension 13 into the passenger compartment. The motor 54 is supported by a bracket comprising strips or plates 55 and 56 which have end portions 57 and 58 respectively, secured to the housing 10, as by spot welding, and which engage and support the motor. Electrical connections are made to the motor through leads such as 60 and 61, as will be more fully described with reference to Fig. 3.

A heating unit or radiator 63, a preferred form of which is shown in section in Fig. 4, is secured within, and extends across the inside of the housing 10, so that air is blown across the outer surface thereof by the fan 52. The heater unit 63 has a housing or shell 64 which is preferably cylindrical and made of aluminum and which has a closed end 65 and an open end 66 with an integral circumferential flange 67 at the open end. A series of heat radiating fins 68 of good heat conducting metal, such as copper or brass, have flange portions 69 that are secured to the outside of the shell 64 to improve the heat radiating efficiency thereof. A housing extension 70 has an opening 71 therethrough that is smaller than the inside of the shell 64, and has a portion 72 that fits into the open end 66 of the shell and a flange 73 which engages the flat surface of the flange 67. This housing extension 70 provides a chamber in which combustion starts as fuel is fed in through a pipe 75 that is fitted into the end of the extension. A baffle 76 which comprises a disc having a small central opening 77 therethrough is fitted into the opening 71 and held in position adjacent a shoulder 78 near the end of the pipe 75. An igniter 80 is mounted on one side of the extension 70 and has an electrical heating unit or coil 81 adjacent an opening 82 in the side wall of the extension. The heating unit 81 is, of course, covered by a housing so that there cannot be any escape of fuel through the opening 82. Electrical connections are made to the heating unit through a lead such as 83 that is connected to a binding post 84 and to ground, as indicated in Fig. 3.

A large portion of the inside of the shell 64 is filled with small pieces of fire resisting ceramic material 85 such as crushed fire brick, held in place between perforated discs or screens 86 and 87. An exhaust pipe 88 communicates with the inside of the shell 64 near the closed end 65 thereof and is connected thereto by a fitting 90 that is threaded into an opening 91 in the shell and a cooperating nut 92. To prevent flames from passing through the spaces between the pieces of ceramic material 85 and into the exhaust pipe 88, a layer of matter shreds of fire resisting material 93, such as rock wool, glass wool or the like, fills a portion of the shell 64 between the perforated disc or screen 87 at the end of the ceramic material and a perforated disc or screen 94.

An adjustable cap 95 having a handle 96 is movably held adjacent the end of the tubular extension 13 within the passenger compartment by an arm 97 that has a socket 98 at one end which engages a ball 99 which is secured to the cap 95. The arm 97 is pivotally connected to one end of an arm 100 by a rivet or other suitable means 101. The other end of the arm 100 is pivotally connected to the tubular extension 13 by a rivet or other suitable means 102. A connecting pipe 104 is preferably provided in the side of the tubular extension 13 for making connection through a defroster hose connection 105 to defrosters 106, as indicated in Fig. 1.

Fuel for combustion within the heating unit or radiator 63 is fed from a supply indicated at 110 in a fuel tank 111 of the automobile through a pipe 112 to a float bowl 113; force for pumping the fuel being provided by a fuel pump 114, that is preferably electrically driven. The pipe 112 is connected to the float bowl 113 by a clamping nut 115. A fuel pipe 116 carries the fuel from an outlet connection 117 on the float bowl to a carburetor or mixing device 119; the pipe 116 being flanged at 118 and secured to a jet 120 of the carburetor or mixing device by a clamping nut 121. Air enters the carburetor or mixing device on the outlet side of the jet 120 through an annular space 122 between a skirt 123 and a hollow body member 124 which provides a mixing chamber 125, and through openings 126 in the body member. The float bowl 113 is preferably so placed vertically with respect to the carburetor 119 that the normal fuel level in the float bowl is below the jet 120 to prevent siphoning of the fuel into the carburetor, but is not sufficiently below to require a very considerable vacuum for effecting movement of the fuel from the float bowl to the carburetor.

The body 124 of the carburetor is threaded into an opening 127 which is substantially centrally located in a wall 128 of a blower housing 129. A centrifugal type of blower 130 having blades such as 131, sides 132 and 133 and a hub 134 is disposed within the housing 129, so that fuel from the mixing chamber 125 is atomized thereby and blown through the pipe 75 into the housing extension 70 for combustion. The hub 134 extends through an opening 140 in the blower housing 129, and is secured to a shaft 136 of a motor or prime mover 137 by a set screw 138, which motor drives the blower. The pipe 75 is fitted into a flanged opening 139 in the blower housing 129 adjacent to the periphery of the blower 130. The motor 137 is supported by a bracket 141 which is secured to one end of the motor and secured to an extension 142 on the flange 73 by bolts 143 or other suitable means. Electrical connections to the blower motor 137 are made through suitable leads such as 145 and 146, as indicated in Fig. 3.

A second centrifugal type blower 147 having blades such as 148, sides 149 and 150, and a hub 151, is secured to the end of the shaft 136 opposite the blower 130 by a set screw 152. The blower 147 is enclosed in a housing 153 having a central opening 154 on one side through which the hub 151 extends, a central opening 155 to which the exhaust pipe 88 is connected by a fitting 156, and an opening 157 adjacent the periphery of the blower 147 to which an outlet exhaust pipe 159 is secured. Hence, the same motor or prime mover 137 which drives the blower 130 also drives the blower 147. The blowers 130 and 147 are preferably so relatively proportioned in size and so designed that the blower 147 has greater force than the blower 130, and consequently keeps the pressure within the radiator or heating unit 63 below normal atmospheric pressure.

Although the use of the blower 130 is preferable and desirable to effect better atomizing of the fuel supplied to the combustion chamber of the radiator 63, it is not essential. The pipe 75 may be directly connected to the carburetor 119 and the size, speed and design of the blower 147 determined to provide pressure below atmospheric in the combustion chamber of the radiator 63 and sufficient vacuum to effect movement of the fuel into the combustion chamber.

The electrical circuit for controlling the system is disclosed diagrammatically in Fig. 3. A switch 160 having contact arms 161 and 162 closes the circuits to the automobile ignition system through a lead 163 and the contact arm 162 from a battery 164 at substantially the same time that it closes the circuit to the fuel pump 114 through the contact arm 161 and a lead 165; one terminal of the battery 164 being grounded at 166 and one terminal of the fuel pump being grounded at 167. A switch 170 has a contact arm 171, an "off" contact or position 172, and a resistance element 173, the effective resistance of which is adapted to be varied by movement of the contact arm 171. The contact arm 171 is preferably mechanically connected to a switch 175 having contact arms 176 and 177 by suitable means indicated by the dot and dash line 178, so that movement of the contact arm 171 of the switch 170 from the "off" position at 172 to engagement with the resistance element 173 also effects engagement of the contact arms 176 and 177 with contacts 178 and 179, respectively. Engagement of the contact 179 by the contact arm 177 closes a circuit from the battery 164 to the fuel pump 114. Engagement of the contact arm 176 with the contact 178 closes a circuit from the battery 164 to the blower motor 137 through the resistance element 173 and a thermostatic switch 180, and also closes a circuit to the heating coil 81 of the igniter through resilient switch arms 181 and 182 and a contact 183 of a thermostatically controlled switch 184; the blower motor 137 being grounded at 185 and the heating coil 81 being grounded at 186. The thermostatic switch 180 and the thermostatically controlled switch 184 are mounted in heat receiving relation with respect to the radiator 63, as shown in Fig. 2; the switch 184 being secured to the radiator 63 by a bracket 190, and a bimetallic thermal responsive element 191 of the switch 180 being anchored to the radiator 63 by a pin 192.

In addition to the resilient contact arms 181 and 182 and the contact 183, the thermostatically controlled switch 184 has a bimetallic thermal responsive element 194 adapted to engage a contact 195 upon flexure of the thermal responsive element 194. Since the contacts 183 and 195 are electrically connected and secured together and to the resilient contact arm 181, at 196, continued flexure of the thermal responsive element after it engages the contact 195 flexes the resilient contact 181 to break contacts 182 and 183. Engagement of the thermal responsive element and contact 195 closes a circuit to the fan motor 54 which has one lead 61 grounded at 197. Separation of the contacts 182 and 183 opens the circuit to the igniter heating coil 81. The contact arms 181 and 182 and the thermal responsive element 194 are insulated from each other by insulating members 198 and 199. Upon excessive heating of the radiator 63, the thermal responsive element 191 flexes away from a contact 200 to open the circuit to the blower motor 137, and thereby stop the flow of fuel to the combustion chamber. Upon resetting of the switch 180, the hot ceramic material at 85 reignites the fuel. Upon cooling of the radiator 63 between periods of use, the thermal responsive switches 180 and 184 return to their normal positions shown in Fig. 3.

In the operation of my heating system herein disclosed, the apparatus is started as explained by closing switches 170 and 175. The fact that the switch 175 closes the circuit to the fuel pump independently of the switch 160 that controls the automobile ignition circuit makes the use of the heating system independent of the operation of the automobile engine. Also, since blowers driven by the motor 137 eliminate the necessity of connections to the vacuum system of the automobile for fuel feeding or exhaust purposes, there is no dependence of the heating system upon operation of the automobile engine, and the heater may be operated while the automobile is parked and without having the engine running.

The starting of the fan motor 54 to circulate heat is delayed by the operation and control of the thermal responsive switch 184 until the radiator 63 has warmed up sufficiently to heat the circulated air. When started, and before the thermal responsive element 43 is sufficiently heated to flex and open the valve 39, the air to be heated is taken from the passenger compartment of the automobile through the conduit section 17. The air is circulated across the radiator 63 and into the passenger compartment through the tubular extension 13. As the air passing into the housing 10 through the conduit section 17 becomes warm enough to flex the thermal responsive element 43, the valve 39 opens to introduce cool fresh air from the conduit section 16 into the housing 10 for heating and passage to the passenger compartment. The system circulates and heats the air in the passenger compartment and introduces a controlled amount of warmed fresh air.

Flow of fuel to the carburetor 119 is controlled by a valve and float of conventional type (not shown) within the float bowl 113. The atomizing of the fuel by the blower 130 improves the vaporization of the fuel and thus increases the efficiency of combustion within the radiator. Also, the direct heating of the ceramic material 85 within the radiator 63 retains the heat within the radiator for radiation thereby to the air surrounding the radiator and reduces heat loss through the exhaust pipe. The ceramic material is sufficiently coarse that combustion takes place in the spaces between the pieces thereof. The heat retained by the ceramic material is sufficient that the heated ceramic material serves as a reigniter to ignite the fuel in case of discontinuity of combustion or short interruptions of fuel flow.

Although it is preferable to have both of the blowers 130 and 147 for atomizing fuel and reducing pressure in the radiator, the system is complete and operative with only one of the blowers, such as 130 or 147. It is preferable to utilize a blower such as 147, and that the blower 147 be so designed that the pressure within the radiator 63 is kept below normal atmospheric pressure. This low pressure has the advantages of (1) preventing the escape of gases from the radiator within the automobile; (2) preventing the possibility of explosion; (3) fuel flow, and consequently combustion, ceases if the pressure within the combustion chamber reaches atmospheric pressure.

Variation of the effective value of the resistance 173 varies the speed of the blowers and consequently changes the rate of feeding and burning fuel. When both blowers are used and both are operated by the same motor, as shown, the speed of the blowers is varied proportionally by control of the one motor.

Although a single embodiment of the invention has been shown and described herein, it will be apparent to those skilled in the art that various and further uses, modifications and changes may be made without departing from the spirit and substance of the invention, the scope of which is commensurate with the appended claims.

What is claimed is:

1. A heating system for vehicles comprising, in combination, a fuel supply, fuel flow control means, a fuel pump for pumping fuel to the fuel flow control means, a carbureting device having one side connected to receive fuel from the fuel flow control means and mix air therewith, a blower connected to the other side of the carbureting device to effect reduced air pressure on said other side of the carbureting device and atomize fuel from said device, a heat radiating unit providing a combustion chamber connected to receive atomized fuel from the blower for combustion therein, a closed conduit connecting said carburetor device with said combustion chamber whereby said carbureting device supplies all of the fluid to said combustion chamber, an exhaust pipe communicating with the combustion chamber, and a blower for reducing the air pressure in the exhaust pipe.

2. A heating system for vehicles comprising, in combination, a fuel supply, fuel flow control means, a fuel pump for pumping fuel to the fuel flow control means, a carbureting device having one side connected to receive fuel from the fuel flow control means and mix air therewith, a blower connected to the other side of the carbureting device to effect reduced air pressure on said other side of the carbureting device and atomize fuel from said device, a heat radiating unit providing a combustion chamber connected to receive atomized fuel from the blower for combustion therein, a closed conduit connecting said carburetor device with said combustion chamber whereby said carbureting device supplies all of the fluid to said combustion chamber, an exhaust pipe communicating with the combustion chamber, and a blower for reducing the air pressure in the exhaust pipe, said blowers being so designed that said combustion takes place at less than normal atmospheric air pressure in the combustion chamber.

3. A heating system for vehicles comprising, in combination, a gasoline supply, gasoline flow control means, a gasoline pump for pumping gasoline to the gasoline flow control means, a carbureting device having one side connected to receive gasoline from the gasoline flow control means and mix air therewith, a blower connected to the other side of the carbureting device to effect reduced air pressure on said other side of the carbureting device and atomize gasoline from said device, a heat radiating unit providing a combustion chamber connected to receive atomized gasoline from the blower for combustion therein, an exhaust pipe communicating with the combustion chamber, and a blower for reducing the air pressure in the exhaust pipe, said blowers being driven by a common motive means and being so proportioned and designed that the combustion in the chamber takes place at less than normal atmospheric pressure.

4. A heating system for vehicles comprising, in combination, a fuel supply, fuel flow control means, a fuel pump for pumping fuel to the fuel flow control means, a carbureting device having one side connected to receive fuel from the fuel flow control means and mix air therewith, a blower connected to the other side of the carbureting device to effect reduced air pressure on said other side of the carbureting device and atomize fuel from said device, a heat radiating unit providing a combustion chamber connected to receive atomized fuel from the blower for combustion therein, said radiating unit having therein a quantity of heat and flame resisting material for retaining heat from the combustion within the chamber, an exhaust pipe communicating with the combustion chamber, and a blower for reducing the air pressure in the exhaust pipe, each of said blowers handling all of the fluid passing through said combustion chamber whereby the pressure in said combustion chamber is a function of the relative capacity of the blowers and the radiating capacity of said unit.

5. A heating system for vehicles comprising, in combination, a fuel supply, fuel flow control means, a fuel pump for pumping fuel to the fuel flow control means, a carbureting device having one side connected to receive fuel from the fuel flow control means and mix air therewith, a blower connected to the other side of the carbureting device to effect reduced air pressure on said other side of the carbureting device and atomize fuel from said device, a heat radiating unit providing a combustion chamber connected to receive atomized fuel from the blower for combustion therein, said carbureting device constituting the sole source of fluid for said combustion chamber, an exhaust pipe communicating with the combustion chamber, said radiating unit having a space intermediate the combustion chamber and exhaust pipe containing pieces of heat and flame resisting ceramic material for retaining heat, and a blower for reducing the air pressure in the exhaust pipe.

6. In a heating system, the combination comprising, a heat radiating unit providing a combustion chamber, means for feeding fuel to the combustion chamber including a blower, means for initially igniting the fuel in the combustion chamber, an exhaust pipe for the removal of exhaust gases from the heat radiating unit, means comprising a blower for reducing the pressure within the combustion chamber to a value below normal atmospheric pressure, both of said blowers being driven by a single motive means, and closed conduit means connecting said heat radiating unit with both of said blowers.

HENRY J. DE N. McCOLLUM.